June 14, 1949.　　　　F. M. POTTER　　　　2,473,257

DYNAMOELECTRIC MACHINE CONSTRUCTION

Filed Aug. 27, 1946

Inventor:
Frederick M. Potter,
by Prowell & Mack
His Attorney.

Patented June 14, 1949

2,473,257

UNITED STATES PATENT OFFICE 2,473,257

DYNAMOELECTRIC MACHINE CONSTRUCTION

Frederick M. Potter, Marblehead, Mass., assignor to General Electric Company, a corporation of New York Application August 27, 1946, Serial No. 693,220

3 Claims. (Cl. 171—228)

1

This invention relates to dynamoelectric machines and particularly to electric motors of the series type which are preferably operated as D.-C. motors, but may also be operated on alternating current.

An object of the present invention is to provide an improved dynamoelectric machine.

Another object of my invention is to provide a motor having an improved stationary member excitation system.

A further object of my invention is to provide an improved exciting winding for a dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
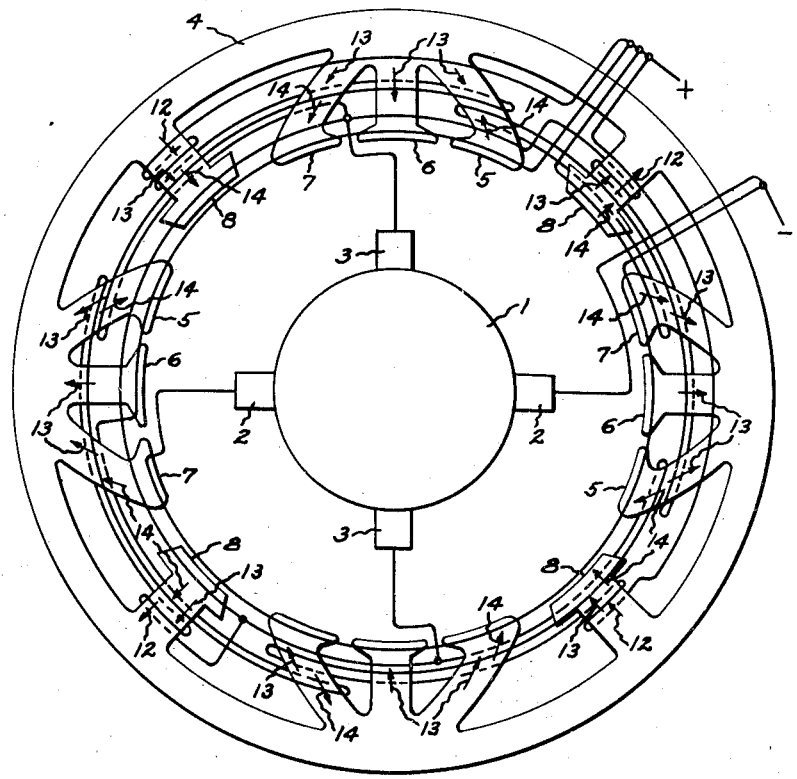
Figure 2:
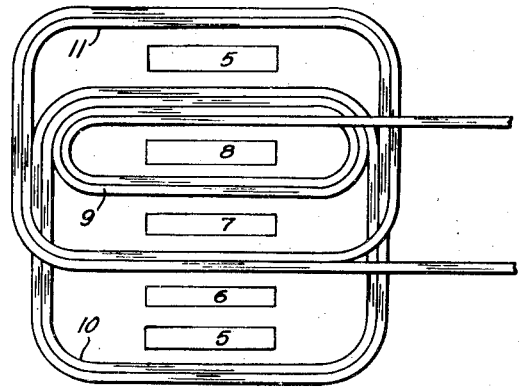

In the drawing Fig. 1 is a schematic illustration of a dynamoelectric machine, such as a series motor, provided with an embodiment of my invention; and Fig. 2 is a plan view of a set of coils used in my improved exciting winding adapted to be arranged on the stationary member field structure shown in Fig. 1 and schematically illustrated thereon.

In dynamoelectric machines such as series excited motors, it generally is desirable to supply a compensating component of excitation in addition to the main series component of excitation and the commutating component of excitation. In order to provide all three of these components of excitation and to minimize the number of internal connections of the exciting winding as well as to minimize the number of turns necessary to form a complete winding, I have found it desirable to form an improved excitation system in which the exciting winding includes a plurality of sets of coils which eliminates these undesirable features and, in addition, provides a winding which is easier to produce and results in an improved product. This improved motor construction takes advantage of the fact that the main series field exciting winding, the commutating field exciting winding, and the compensating field exciting winding all carry the same current, and, therefore, may all be connected directly in series. As shown in Fig. 1, the dynamoelectric machine is provided with a rotatable member or armature 1 which may be of a conventional type having a commutator and to which current is supplied in any suitable manner, as through

2 brushes 2 and 3; as shown, the two brushes 2 are connected in parallel directly to one side of the source of power supply, and the other brushes 3 are connected in parallel across the field exciting winding which is divided into parallel paths. This field exciting winding is arranged to excite a stationary member having a yoke 4 of magnetic material on which a plurality of polar projections or teeth 5, 6, 7, and 8 are formed and which are adapted to be utilized to supply main series excitation, commutating excitation, and an armature reaction compensating component of excitation to the machine. These polar projections 5, 6, 7, and 8 are grouped into sets according to the number of poles which the machine provides, and each group of polar projections is adapted to be excited magnetically by a group or set of coils. Each group or set of coils is formed of a single or multi-wire continuous electrical conductor, as is more clearly shown in Fig. 2, and each set of coils is connected in series and arranged around certain of the polar projections for providing components of main series excitation by the polar projections 5, 6, and 7 and for providing a component of commutating excitation by the polar projection 8 of each set. The compensating component of excitation is provided by one of the polar projections 5 of one set of coils and by the polar projections 7 of an adjacent set of coils. In order to obtain this effect, the compensating coil of each set of coils is arranged to overlap a part of the next set of coils. The detail construction of each of these sets of coils, which is the same for each pole of the machine, is more clearly illustrated in Fig. 2. As shown in this figure, the continuous single or multi-wire electrical conductor which forms the three coils of each set is wound to form a commutating coil 9 which is adapted to be arranged around the commutating polar projection 8 and is continuously connected in series with the turns of the series coil 10, which also is adapted to extend around the commutating polar projection 8 and thereby forms a common source of excitation for this polar projection with the commutating coil 9. This series coil 10 is adapted to be arranged around in addition a set of three main series polar projections 5, 6 and 7 and to provide the main series excitation to this set of polar projections which forms a main pole of the machine. The conductor which forms this set of coils extends from the series coil 10 directly into the turns of the compensating coil 11, thereby connecting it directly in series with the series coil 10, and this coil 11 is formed to embrace a polar projection 5 of the adjacent set of polar projections and overlaps part of the series coil of an adjacent set of coils and also is common to the commutating polar projection 8 and extends around the polar projection 7 of its respective main series pole. Thus, the compensating coil 11 not only provides a component of compensating excitation to the machine, but also provides a part of the commutating excitation for the machine. In this manner, the turns of the commutating field exciting winding may be made much less than would normally be required for the commutating coil, as a part of the commutating field excitation is provided by each of the coils 9, 10, and 11 which act in common with respect to the commutating polar projection 8. The relationships of the various field exciting winding coils are indicated by arrows 12, 13, and 14 in Fig. 1 for the coils 9, 10, and 11, respectively, and illustrate how each set of coils functions to provide the desired components of excitation to the various polar projections of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine of the commutator type having a stationary member with a plurality of polar projections, a field exciting winding comprising sets of coils corresponding in number to a predetermined number of poles, each of said sets of coils being formed of a single electrical conductor with all coils of each set connected in series and arranged around certain of said polar projections for providing components of main series excitation by certain of said polar projections and commutating excitation by another of said polar projections, and one coil of each set arranged to excite part of said main series polar projections of the respective set of coils and part of the main series polar projections of an adjacent set of coils for providing a component of compensating excitation.

2. A dynamoelectric machine of the commutator type having a stationary member with a plurality of polar projections, a field exciting winding comprising sets of coils corresponding in number to a predetermined number of poles, each of said sets of coils being formed of a single electrical conductor with all coils of each set connected in series and arranged around certain of said polar projections for providing components of main series excitation by certain of said polar projections and commutating excitation by another of said polar projections, and one coil of each set arranged to excite part of said main series polar projections of the respective set of coils and part of the main series polar projections of an adjacent set of coils for providing a component of compensating excitation, all coils of each set providing part of the commutating excitation to said commutating polar projection of each respective set of coils.

3. A commutator type dynamoelectric machine having a stationary member with a plurality of polar projections, a field exciting winding comprising sets of coils corresponding in number to a predetermined number of poles, each of said sets of coils being formed of a single electrical conductor with all coils of each set connected in series and arranged around certain of said polar projections for providing components of series and commutating excitation, and one coil of each set overlapping part of another set of coils for providing a component of compensating excitation.

FREDERICK M. POTTER.

REFERENCES CITED

The following references are of record in the file of this patent:

UNITED STATES PATENTS

| Number | Name | Date |
|---|---|---|
| 1,766,799 | Perkins | June 24, 1930 |
| 1,910,321 | Clark | May 23, 1933 |